United States Patent
Lee et al.

(10) Patent No.: US 11,318,614 B2
(45) Date of Patent: May 3, 2022

(54) ROBOT CLEANER AND OPERATING METHOD THEREOF

(71) Applicant: LG ELECTRONICS INC., Seoul (KR)

(72) Inventors: Kamin Lee, Seoul (KR); Kokeun Kim, Seoul (KR); Suyeon Kim, Seoul (KR); Seungah Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 212 days.

(21) Appl. No.: 16/694,525

(22) Filed: Nov. 25, 2019

(65) Prior Publication Data
US 2021/0114213 A1 Apr. 22, 2021

(30) Foreign Application Priority Data
Oct. 21, 2019 (KR) .................. 10-2019-0130947

(51) Int. Cl.
*B25J 9/16* (2006.01)
*A47L 11/40* (2006.01)
*G05D 1/02* (2020.01)
*B25J 11/00* (2006.01)
*B25J 13/08* (2006.01)

(52) U.S. Cl.
CPC ......... *B25J 9/1664* (2013.01); *A47L 11/4011* (2013.01); *B25J 9/163* (2013.01); *B25J 11/0085* (2013.01); *B25J 13/084* (2013.01); *G05D 1/0221* (2013.01); *G05D 1/0238* (2013.01); *G05D 1/0274* (2013.01); *A47L 2201/04* (2013.01); *G05D 2201/0203* (2013.01)

(58) Field of Classification Search
CPC .............. A47L 11/4011; A47L 11/4061; A47L 11/4063; A47L 11/06; A47L 2201/04; G05D 2201/0203; G05D 1/0214; G05D 1/0221; G05D 1/0238; G05D 1/0274; B25J 11/0085; B25J 9/163; B25J 9/1664; B25J 9/1676; B25J 9/1697
USPC ...... 700/245, 258, 255, 29; 706/23, 25, 903; 318/568.12, 568.16, 806; 701/23, 41
See application file for complete search history.

(56) References Cited

U.S. PATENT DOCUMENTS

| | | | | |
|---|---|---|---|---|
| 9,008,840 B1* | 4/2015 | Ponulak | ................. | G06N 3/049 700/250 |
| 2013/0325775 A1* | 12/2013 | Sinyavskiy | ............ | G06N 20/00 706/25 |
| 2015/0197012 A1* | 7/2015 | Schnittman | ............ | G05D 1/027 700/250 |
| 2018/0210445 A1* | 7/2018 | Choi | .................... | G05D 1/0274 |
| 2018/0353042 A1* | 12/2018 | Gil | ........................ | G05D 1/0088 |
| 2019/0213438 A1* | 7/2019 | Jones | ................... | G06K 9/6274 |

* cited by examiner

*Primary Examiner* — Dalena Tran
(74) *Attorney, Agent, or Firm* — Birch, Stewart, Kolasch & Birch, LLP

(57) ABSTRACT

A robot cleaner to avoid a stuck situation through artificial intelligence (AI) may acquire a surrounding map, based on the sensing information, determine escape path factors based on the surrounding map by using the compensation model, if the stuck situation of the robot cleaner is detected, and control the driving motor such that the robot cleaner travels, based on the determined escape path factors.

19 Claims, 14 Drawing Sheets

ROBOT CLEANER AND OPERATING METHOD THEREOF

CROSS-REFERENCE TO RELATED APPLICATIONS

This application claims priority to Korean Patent Application No. 10-2019-0130947 filed on Oct. 21, 2019 in Korea, the entire contents of which is hereby incorporated by reference in its entirety.

BACKGROUND

The present disclosure relates to a robot cleaner capable of avoiding a stuck situation using artificial intelligence (AI).

A robot cleaner is an artificial intelligence device that automatically cleans by suctioning foreign matters, such as dust, from a floor surface while traveling by itself in a zone to be cleaned without the operation of the user.

The robot cleaner recognizes the structure of a space, sets a cleaning path, and performs a cleaning operation while traveling along the set cleaning path. The robot cleaner performs cleaning according to a predetermined schedule or based on the command of a user.

Typically, such a robot cleaner detects a distance to an obstacle such as furniture, office supplies, walls, etc. installed in a cleaning zone, and maps the cleaning zone based on the distance, or controls driving of a left wheel and a right wheel to perform an obstacle avoidance operation.

However, the robot cleaner may be confined without actively coping with a new stuck situation.

Accordingly, there is necessary a method for effectively avoiding a stuck situation if the robot cleaner detects a stuck situation.

SUMMARY

The present disclosure is to provide a robot cleaner capable of performing avoidance traveling to avoid a stuck situation, if the stuck situation is detected.

The present disclosure is to provide a robot cleaner capable of performing avoidance traveling along the optimal escape path, if the stuck situation is detected.

According to an embodiment of the disclosure, a robot cleaner to avoid a stuck situation through artificial intelligence (AI) may acquire a surrounding map, based on the sensing information; determine escape path factors based on the surrounding map by using the compensation model, if the stuck situation of the robot cleaner is detected, and control the driving motor such that the robot cleaner travels, based on the determined escape path factors.

As described above, according to an embodiment of the present disclosure, the robot cleaner may travel to rapidly avoid a stuck situation, even if the robot cleaner detects a new stuck situation.

According to an embodiment of the present disclosure, as the robot cleaner travels along the optimal escape path under the stuck situation, the robot cleaner may cope with unnecessary power consumption, and may actively cope with the stuck situation.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE EMBODIMENTS

Figure 1:
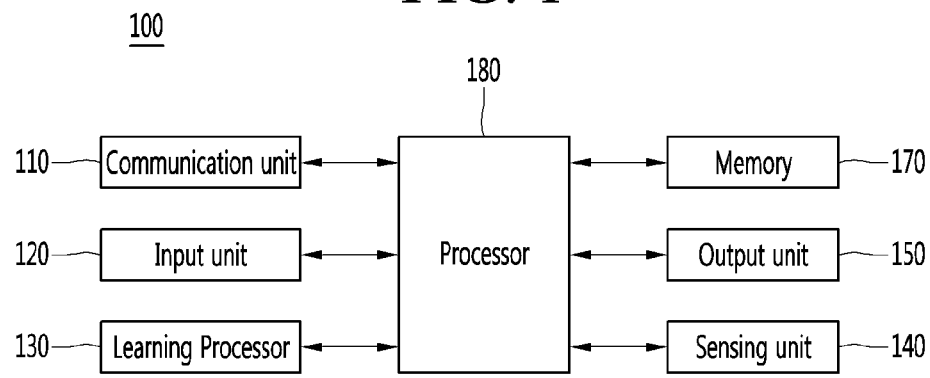
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, if one part (or element, device, etc.) is referred to as being 'connected' to another part (or element, device, etc.), it should be understood that the former may be 'directly connected' to the latter, or 'electrically connected' to the latter via an intervening part (or element, device, etc.). It will be further understood that if one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network may be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer if the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving device may include an actuator or a motor and may perform various physical operations such as moving a robot joint. In addition, a movable robot may include a wheel, a brake, a propeller, and the like in a driving device, and may travel on the ground through the driving device or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined path, and a technology for automatically setting and traveling a path if a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

In this case, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are illustrated together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device (or an AI apparatus) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing device 140, an output device 150, a memory 170, and a processor 180.

The communication unit 110 may transmit and receive data to and from external devices such as other AI devices 100*a* to 100*e* and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

In this case, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used if an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

In this case, the learning processor 130 may perform AI processing together with the learning processor 240 of the AI server 200.

In this case, the learning processor 130 may include a memory integrated or implemented in the AI device 100. Alternatively, the learning processor 130 may be implemented by using the memory 170, an external memory directly connected to the AI device 100, or a memory held in an external device.

The sensing device 140 may acquire at least one of internal information about the AI device 100, ambient environment information about the AI device 100, and user information by using various sensors.

Examples of the sensors included in the sensing device 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output device 150 may generate an output related to a visual sense, an auditory sense, or a haptic sense.

In this case, the output device 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

If the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
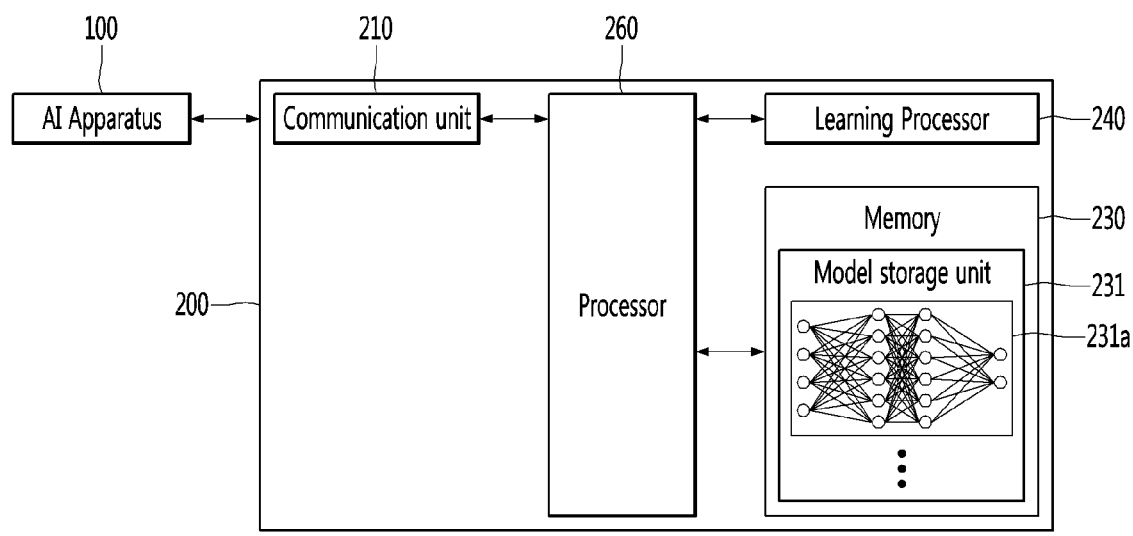
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. In this case, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 may transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models is implemented in software, one or more instructions that constitute the learning model may be stored in memory 230.

The processor 260 may infer the result value for new input data by using the learning model and may generate a response or a control command based on the inferred result value.

Figure 3:
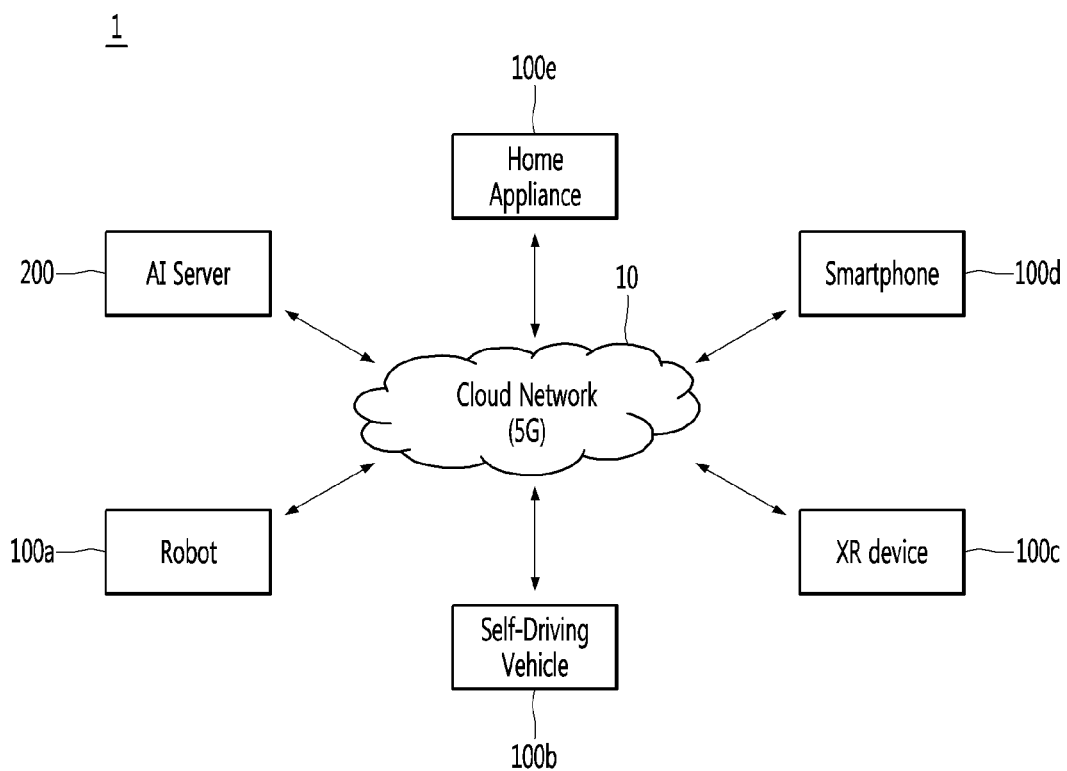
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

In other words, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, In other words, the robot 100a, the self-driving vehicle 100b, the XR device 100c, the smartphone 100d, or the home appliance 100e through the cloud network 10, and may assist at least part of AI processing of the connected AI devices 100a to 100e.

In this case, the AI server 200 may learn the artificial neural network according to the machine learning algorithm instead of the AI devices 100a to 100e, and may directly store the learning model or transmit the learning model to the AI devices 100a to 100e.

In this case, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the path and the travel plan, may determine the response to user interaction, or may determine the operation.

The robot 100a may use the sensor information acquired from at least one sensor among the lidar, the radar, and the camera so as to determine the travel path and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

In this case, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel path and the travel plan, and may control the driving device such that the robot 100a travels along the determined travel path and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving device based on the control/interaction of the user. In this case, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the path and the travel plan, or may determine the operation.

Like the robot 100a, the self-driving vehicle 100b may use the sensor information acquired from at least one sensor among the lidar, the radar, and the camera so as to determine the travel path and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

In this case, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel path and the travel plan, and may control the driving device such that the self-driving vehicle 100b travels along the determined travel path and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving device based on the control/interaction of the user. In this case, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

In this case, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel path or the travel plan. For example, the robot 100a and the self-driving vehicle 100b having the self-driving function may determine at least one of the travel path or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

In this case, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, if it is determined that the driver is in a drowsy state, the robot 100a may activate the self-driving function of the self-driving vehicle 100b or assist the control of the driving device of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot In other words subjected to control/ interaction in an XR image. In this case, the robot 100*a* may be separated from the XR device 100*c* and interwork with each other.

If the robot 100*a*, which is subjected to control/interaction in the XR image, may acquire the sensor information from the sensors including the camera, the robot 100*a* or the XR device 100*c* may generate the XR image based on the sensor information, and the XR device 100*c* may output the generated XR image. The robot 100*a* may operate based on the control signal input through the XR device 100*c* or the user's interaction.

For example, the user may confirm the XR image corresponding to the time point of the robot 100*a* interworking remotely through the external device such as the XR device 100*c*, adjust the self-driving travel path of the robot 100*a* through interaction, control the operation or driving, or confirm the information about the surrounding object.

<AI+Self-Driving+XR>

The self-driving vehicle 100*b*, to which the AI technology and the XR technology are applied, may be implemented as a mobile robot, a vehicle, an unmanned flying vehicle, or the like.

The self-driving vehicle 100*b*, to which the XR technology is applied, may refer to a self-driving vehicle having a means for providing an XR image or a self-driving vehicle In other words subjected to control/interaction in an XR image. Particularly, the self-driving vehicle 100*b* In other words subjected to control/interaction in the XR image may be distinguished from the XR device 100*c* and interwork with each other.

The self-driving vehicle 100*b* having the means for providing the XR image may acquire the sensor information from the sensors including the camera and output the generated XR image based on the acquired sensor information. For example, the self-driving vehicle 100*b* may include an HUD to output an XR image, thereby providing a passenger with a real object or an XR object corresponding to an object in the screen.

In this case, if the XR object is output to the HUD, at least part of the XR object may be outputted so as to overlap the actual object to which the passenger's gaze is directed. Meanwhile, if the XR object is output to the display provided in the self-driving vehicle 100*b*, at least part of the XR object may be output so as to overlap the object in the screen. For example, the self-driving vehicle 100*b* may output XR objects corresponding to objects such as a lane, another vehicle, a traffic light, a traffic sign, a two-wheeled vehicle, a pedestrian, a building, and the like.

If the self-driving vehicle 100*b*, which is subjected to control/interaction in the XR image, may acquire the sensor information from the sensors including the camera, the self-driving vehicle 100*b* or the XR device 100*c* may generate the XR image based on the sensor information, and the XR device 100*c* may output the generated XR image. The self-driving vehicle 100*b* may operate based on the control signal input through the external device such as the XR device 100*c* or the user's interaction.

Figure 4:
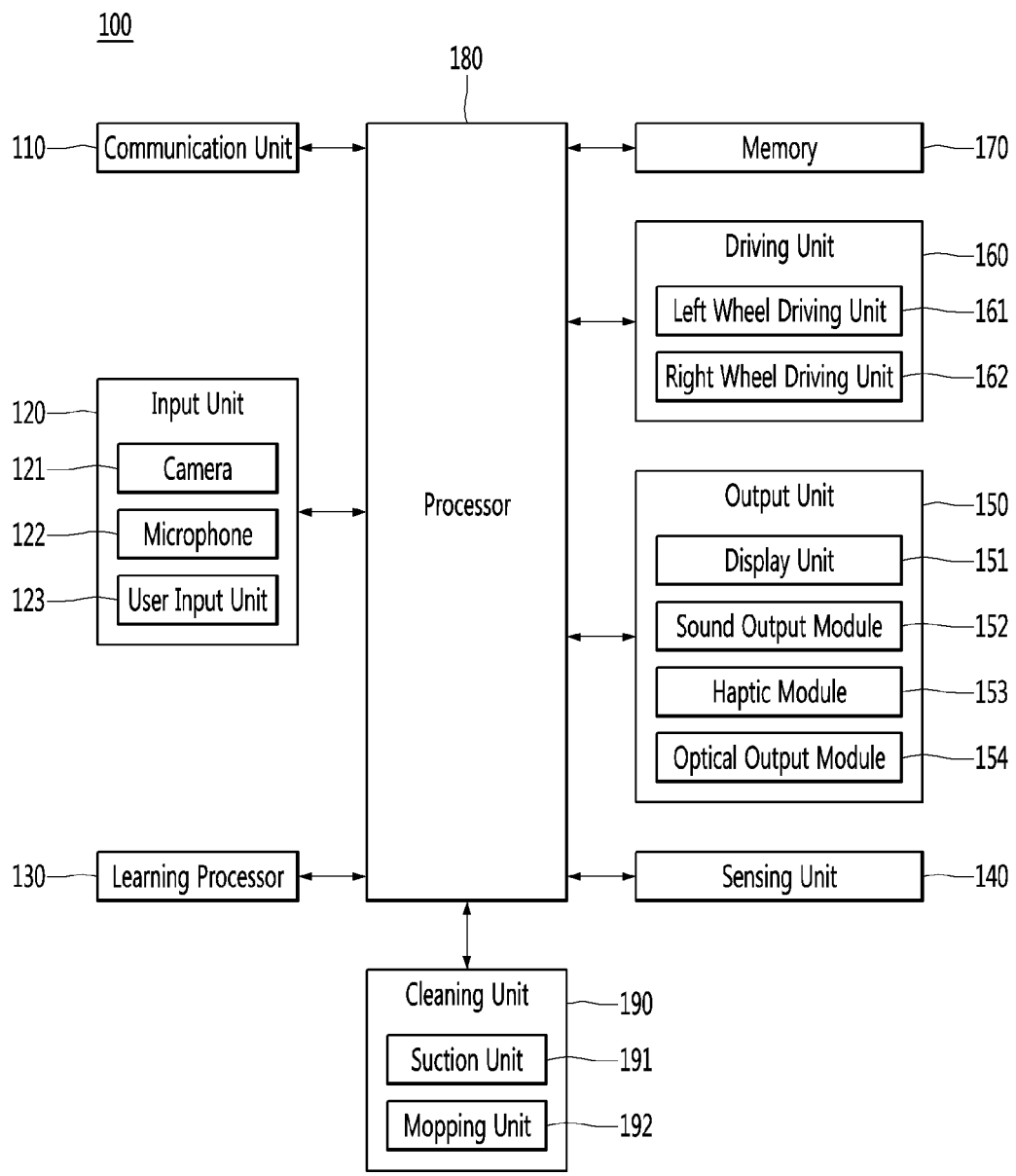
FIG. 4 illustrates an AI device 100 according to an embodiment of the present disclosure.

FIG. 4 illustrates an AI device 100 according to an embodiment of the present disclosure.

The redundant repeat of FIG. 1 will be omitted below.

Referring to FIG. 4, the AI device 100 may further include a driving device 160 and a cleaning unit 190.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video acquired by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and if information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The sensing device 140 may be called a sensor unit.

The sensing device 140 may include at least one of a depth sensor (not illustrated) or an RGB sensor (not illustrated) to acquire image data for a surrounding of the AI robot 100.

The depth sensor may sense that light irradiated from the light emitting unit (not illustrated) is reflected and return. The depth sensor may measure the difference between times at which the returning light is transmitted, an amount of the returning light, and a distance from an object.

The depth sensor may acquire information on a two dimensional image or a three dimensional image of the surrounding of the AI robot 100, based on the distance from the object.

The RGB sensor may acquire information on a color image for an object or a user around the AI robot 100. The information on the color image may be an image acquired by photographing an object. The RGB sensor may be named an RGB camera.

In this case, the camera 121 may refer to the RGB sensor.

The output device 150 may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user may feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The driving device 160 may move the AI robot 100 in a specific direction or by a certain distance.

The driving device 160 may include a left wheel driving device 161 to drive the left wheel of the AI robot 100 and a right wheel driving device 162 to drive the right wheel.

The left wheel driving device 161 may include a motor for driving the left wheel, and the right wheel driving device 162 may include a motor for driving the right wheel.

Although the driving device 160 includes the left wheel driving device 161 and the right wheel driving device 162 by way of example as in FIG. 4, but the present disclosure is not limited thereto. In other words, according to an embodiment, the driving device 160 may include only one wheel.

The cleaning unit 190 may include at least one of a suction unit 191 or a mopping unit 192 to clean the floor around the AI device 100.

The suction unit 191 may be referred to as a vacuum cleaning unit.

The suction unit 191 may suction air to suction foreign matters such as dust and garbage around the AI device 100.

In this case, the suction unit 191 may include a brush or the like to collect foreign matters.

The mopping unit 192 may wipe the floor in the state that a mop is at least partially in contact with the bottom surface of the AI device 100.

In this case, the mopping unit 192 may include a mop and a mop driving device to move the mop In this case, the mopping unit 192 may adjust the distance from the ground surface through the mop driving device. In other words, the mop driving device may operate such that the mop makes contact with the ground surface if the mopping is necessary.

Figure 5:
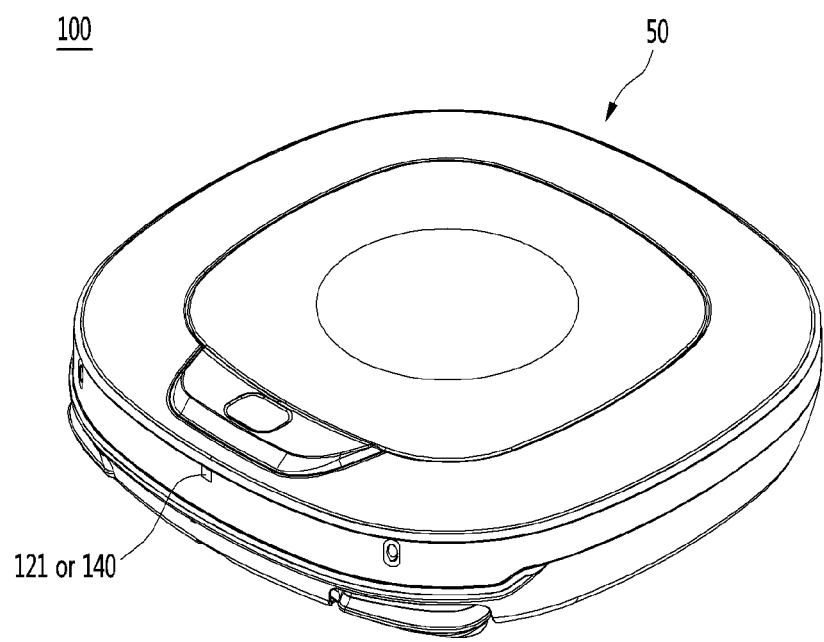
FIG. 5 a perspective view of an AI device 100 according to an embodiment of the present disclosure.

FIG. 5 a perspective view of the AI device 100 according to an embodiment of the present disclosure.

Referring to FIG. 5, the AI robot 100 may include a cleaner body 50 and a camera 121 or a sensing device 140.

The camera 121 or the sensing device 140 may irradiate a light forward and receive the reflected light.

The camera 121 or the sensing device 140 may acquire the depth information using the difference between times at which the received lights are returned.

The cleaner body 50 may include remaining components except the camera 121 and the sensing device 140 described with reference to FIG. 4.

Figure 6:
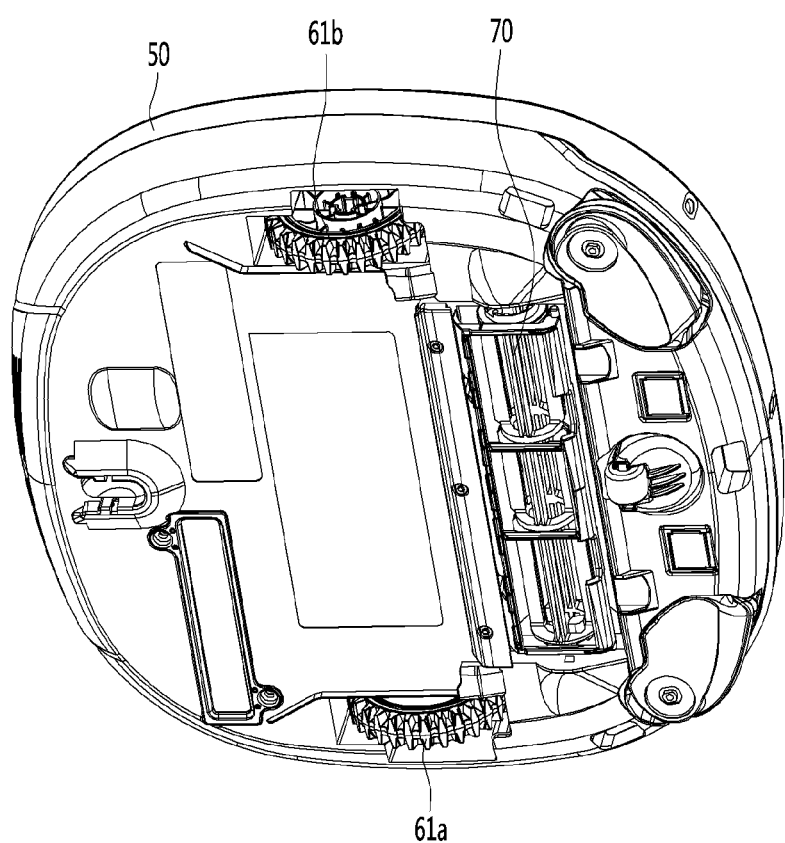
FIG. 6 a bottom view of an AI device 100 according to an embodiment of the present disclosure.

FIG. 6 is a bottom view of the AI device 100 according to an embodiment of the present disclosure.

Referring to 6, the AI device 100 may further include a cleaner body 50, a left wheel 61a, a right wheel 61b, and a suction unit 70 in addition to the components of FIG. 4.

The left wheel 61a and the right wheel 61b may allow the cleaner body 50 to travel.

The left wheel driving device 161 may drive the left wheel 61a and the right wheel driving device 162 may drive the right wheel 61b.

As the left wheel 61a and the right wheel 61b are rotated by the driving device 160, the AI robot 100 may suction foreign matters such as dust and garbage through the suction unit 70:

The suction unit 70 is provided in the cleaner body 50 to suction dust on the floor surface.

The suction unit 70 may further include a filter (not illustrate) to collect foreign matters from the sucked air stream and a foreign matter receiver (not illustrated) to accumulate foreign matters collected through the filter.

In addition to the components of FIG. 4, the AI robot 100 may further include a mopping unit (not illustrated).

The mopping unit (not illustrated) may include a damp cloth (not illustrated) and a motor (not illustrated) to rotate the damp cloth in contact with the floor and to move the damp cloth along a set pattern.

The AI device 100 may wipe the floor with the mopping unit (not illustrated).

Figure 7A:
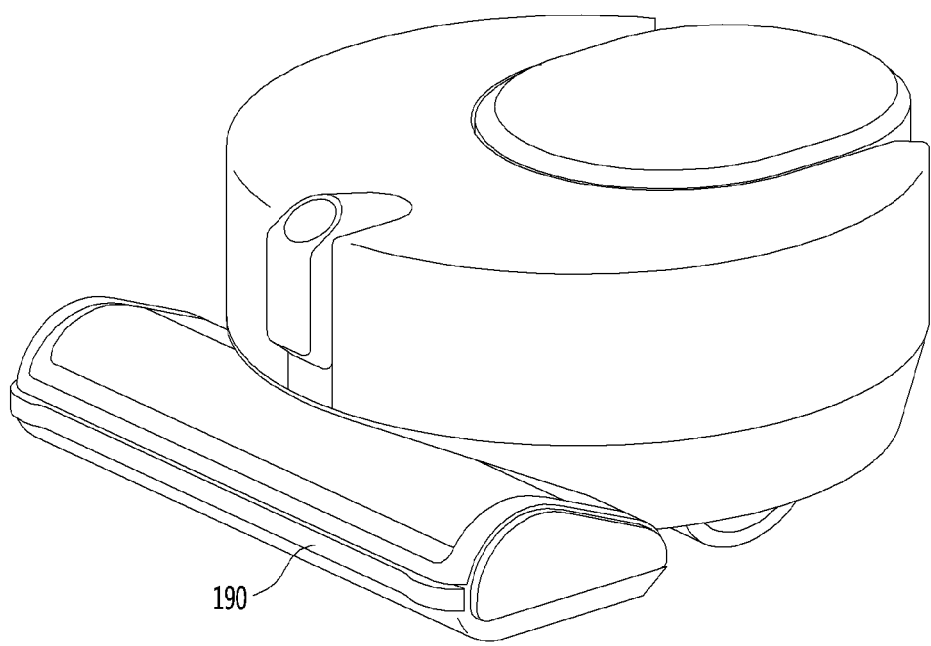
FIG. 7*a* is a side view of an artificial intelligence device according to another embodiment of the present disclosure.
Figure 7B:
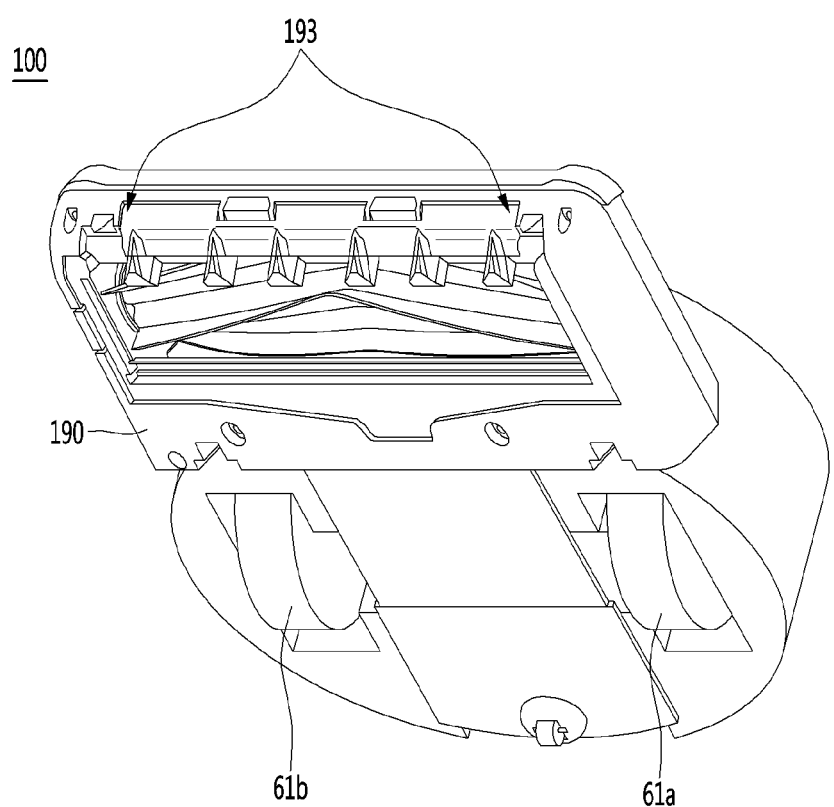
FIG. 7*b* is a bottom view of the artificial intelligence device.

FIG. 7a is a side view of an artificial intelligence device according to another embodiment of the present disclosure, and FIG. 7b is a bottom view of the artificial intelligence device.

Hereinafter, the artificial intelligence device 100 may be referred to as a robot cleaner.

Referring to FIGS. 7a and 7b, the robot cleaner 100 may further include a bumper 190 in addition to the components of FIG. 4.

The bumper 190 may be provided at the lower end of the main body of the robot cleaner 100. The bumper 190 may include a cleaning unit 190 including the suction unit 191 and the mopping unit 192 illustrated in FIG. 4.

The bumper 190 may mitigate impact applied to the main body due to collision with an obstacle or another object while the robot cleaner 100 travels.

The bumper 190 may include one or more bumper sensors (not illustrated). The bumper sensor may measure the impulse applied to the bumper 190.

The bumper sensor may generate a bumper event if a predetermined amount or more of impact is detected. The bumper event may be used to detect a stuck situation of the robot cleaner 100.

In addition, each of the left wheel 61a and the right wheel 61b may include a wheel sensor. The wheel sensor may be an optical sensor for measuring the amount of rotation of the left wheel or the right wheel. The amount of rotation of the left wheel or the right wheel measured through the wheel sensor may be used to calculate the movement distance of the robot cleaner 100.

One or more cliff sensors 193 may be provided at the lower surface of the bumper 190. The cliff sensor 193 measures a distance between the floor and the cliff sensor 193 using a transmitted infrared signal and a reflected infrared signal.

The processor 180 may determine that the robot cleaner 100 reaches a staircase or a cliff if the measured distance is equal to or greater than a certain distance or if the reflected infrared signal is not detected for a certain time.

Figure 8:
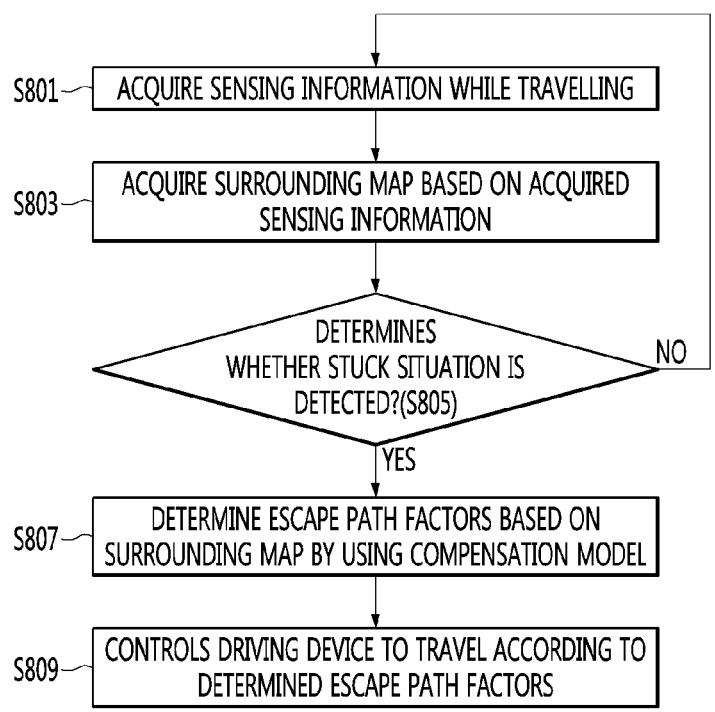
FIG. 8 is a flowchart illustrating an operating method of a robot cleaner to avoid a stuck situation according to an embodiment of the present disclosure.

FIG. 8 is a flowchart illustrating an operating method of a robot cleaner according to an embodiment of the present disclosure.

The processor 180 of the robot cleaner 100 acquires sensing information through the sensing device 140 while travelling (S801).

The sensing information may include one or more of a bumper events and three-dimensional image data (hereinafter, 3D image data).

The sensing device 140 may include one or more of the depth sensor and the bumper sensor described with reference to FIG. 4.

The 3D sensor may be provided on the front surface of the main body of the robot cleaner 100.

If the 3D sensor is a depth sensor, the 3D sensor may sense that the light irradiated from the light emitting unit (not illustrated) is reflected from an object and returned. The depth sensor may measure a distance to the object based on the difference between times that light is sensed, and an amount of returned light.

The depth sensor may acquire 2D image data or 3D image data about the surroundings of the robot cleaner 100 based on the measured distance between objects.

A plurality of 3D sensors may be disposed on the front surface of the main body of the robot cleaner 100.

Meanwhile, the robot cleaner 100 may acquire a bumper event through a bumper sensor provided in the bumper 190. The bumper sensor may measure an impulse applied to the bumper, and generate a bumper event if the measured impulse is greater than or equal to a preset impulse.

The processor 180 may determine that the bumper event is detected if the impulse detected by the bumper sensor is greater than or equal to the preset impulse.

The robot cleaner 100 may collect sensing information in real time during travelling along a preset cleaning path. The preset cleaning path may be a path on which the robot cleaner 100 has to travel on a cleaning map generated by Simultaneous Localization and Mapping (SLAM).

The processor 180 acquires a surrounding map based on the acquired sensing information (S803).

The processor 180 may generate the surrounding map by converting the acquired 3D data and the bumper event into surrounding map data.

The surrounding map data may be data used for generating the surrounding map of the robot cleaner 100 based on the present position of the robot cleaner 100 on the cleaning map.

The surrounding map may represent a surrounding situation within a specific distance based on the present position of the robot cleaner 100.

The processor 180 may store the converted surrounding map data and the surrounding map in the memory 170.

The processor 180 may store surrounding map information, which is acquired in real time, in the memory 170.

Hereinafter, the surrounding map will be described with reference to FIG. 9.

Figure 9:
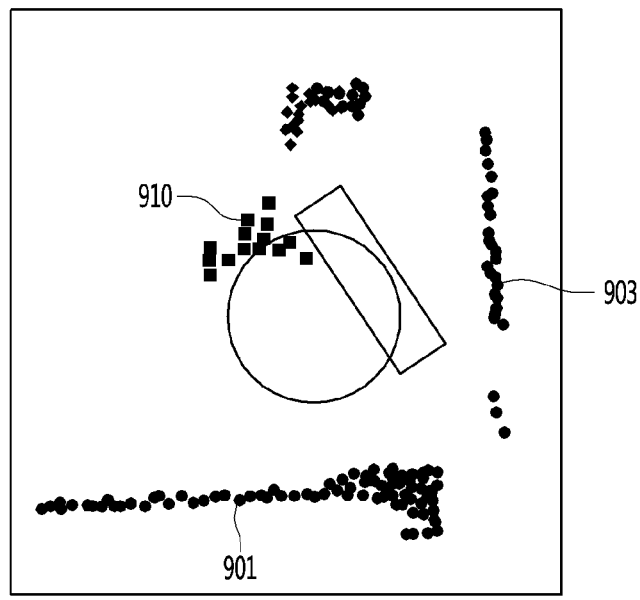
FIG. 9 is a view illustrating a surrounding map generated using surrounding map data according to an embodiment of the present disclosure.

FIG. 9 is a view illustrating a surrounding map generated using the surrounding map data according to an embodiment of the present disclosure.

FIG. 9 illustrates a surrounding map 900 generated based on the surrounding map data.

The surrounding map 900 may be a map generated based on the present position of the robot cleaner 100 on the cleaning map, and the surrounding map data.

The processor 180 may convert 3D image data into dots 901 and 903 which are in a first color and represent an object.

The processor 180 may convert the bumper event into the dots 910 which are in the second color and represent an obstacle.

The dots in each color may represent one obstacle.

The processor 180 may generate a surrounding map 900 including the converted dots 901 and 903 in the first color and the dots 910 in the second color.

As another example, the surrounding map 900 may be generated only by bumper events or may be generated only by 3D image data. In this case, the surrounding map may be generated by the points in one color.

The following description will be made with reference to FIG. 8 again.

The processor 180 determines whether a stuck situation is detected based on the acquired surrounding map (S805).

The processor 180 may determine that the robot cleaner 100 has experienced the stuck situation, if the number of times that the bumper events occur is equal to or greater than the preset number of times on the surrounding map 900 illustrated in FIG. 9.

As another example, the processor 180 may determine that the robot cleaner 100 has experienced the stuck situation, if the robot cleaner 100 is positioned for a preset time or more, and if the number of times that the bumper events occur is equal to or greater than the preset number of times on the surrounding map 900 illustrated in FIG. 9.

As another example, the processor 180 may determine that the robot cleaner 100 has experienced a stuck situation, if the number of times that bumper events occurs for a specific time is equal to or greater than the preset number of times.

The processor 180 may store the surrounding map at the time point that the robot cleaner 100 has experienced the stuck situation, in the memory 170 as image data.

As another example, the processor 180 may determine whether the present situation of the robot cleaner 100 is a stuck situation, based on the surrounding map by using the stuck-situation aware model.

The stuck-situation aware model may be an artificial neural network based model capable of determining the stuck situation from the surrounding map data.

The stuck-situation aware model may be a model that is supervised and trained through a deep learning algorithm or a machine learning algorithm.

The details thereof will be described with reference to FIG. 10 below.

Figure 10:
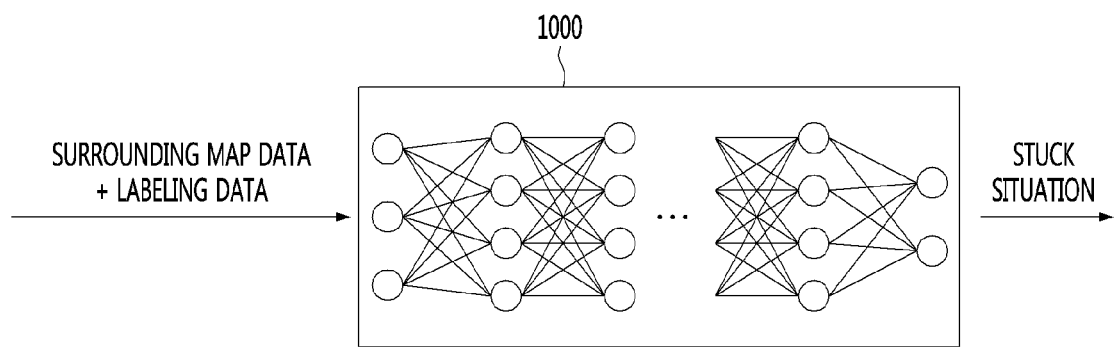
FIG. 10 is a view illustrating a stuck-situation aware model according to an embodiment of the present disclosure.

FIG. 10 is a view illustrating the stuck-situation aware model according to an embodiment of the present disclosure.

Referring to FIG. 10, a stuck-situation aware model 1000 based on the artificial neural network is illustrated.

The surrounding map data acquired by the robot cleaner 100 may be labeled with labeling data representing the stuck situation.

The surrounding map data and the stuck situation (or whether there is a stuck situation) labeled on the surrounding map data may constitute a training set and may be used for supervised learning of the stuck-situation aware model 1000.

The processor 180 may extract an input feature vector from the surrounding map data. The extracted input feature vector may be input to the stuck-situation aware model 1000.

The processor 180 may be trained to minimize a cost function indicating a difference between the target feature vector (target feature point), which is the result of the inference of the stuck-situation aware model, and the stuck situation which is labeled data.

The cost function of the stuck-situation aware model 1000 may be expressed as the squared mean of differences between a label for the stuck situation of the robot cleaner 100 corresponding to the learning data, and the situations inferred from each learning data.

Model parameters included in the artificial neural network may be determined such that the stuck-situation aware model minimizes the cost function through the learning.

The target feature point of the stuck-situation aware model 1000 may form an output layer of a single node representing whether the robot cleaner 100 is in the stuck situation. The target feature point may have a value of '1' to represent the stuck situation, and may have a value of '0' to represent a non-stuck situation. In this case, the output layer of the stuck-situation aware model 1000 may employ Sigmoid: Hyperbolic tangent (tank) as an activation function.

As another example, the target feature point of the stuck-situation aware model 1000 may form output layer of two output nodes representing a stuck situation or a non-stuck situation of the robot cleaner 100.

In other words, the target feature point (target feature vector) may constitute the stuck situation or the non-stuck situation. The target feature point (target feature vector) may have the value of "(1, 0)" if the target feature point represents the stuck situation, and have the value of "(0, 1)" if the target feature point represents the non-stuck situation. In this case, the output layer of the stuck-situation aware model 1000 employs Softmax as an activation function.

The following description will be made with reference to FIG. 8 again.

The processor 180 determines escape path factors based on the surrounding map by using a compensation model if it is determined the stuck situation is detected (S807).

In one embodiment, the compensation model may be a model, which is trained through reinforcement learning and determines one or more factors of the escape path of the robot cleaner 100.

The compensation model may be an artificial neural network based model which is trained through reinforcement learning in a deep learning algorithm or a machine learning algorithm.

The compensation model may be a model trained through reinforcement learning by the learning processor 130 of the robot cleaner 100, the processor 180 of the robot cleaner 100, or the learning processor 240 of the AI server 200.

The compensation model may be a model to infer the optimal escape path factors, from the learning surrounding map.

The processor 180 may determine escape path factors from the surrounding map by using a previously trained compensation model.

The escape path factors include at least one of a rotation angle, a rotation direction, a forward direction, or a backward direction of the robot cleaner 100.

Each of the escape path factors may be a factor indicating an action that has to be taken to avoid the stuck situation or escape from the stuck situation, if the robot cleaner 100 detects the stuck situation.

Figure 11:
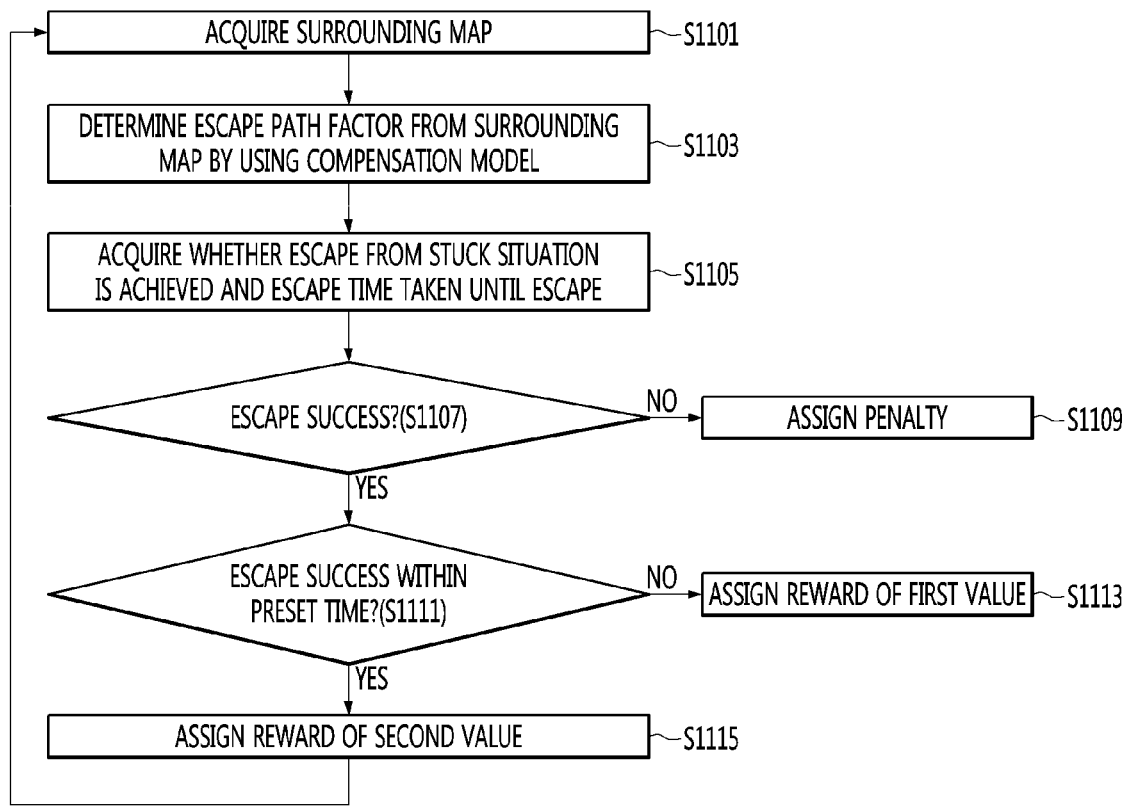
FIGS. 11 to 13 are views illustrating a reinforcement learning procedure for a compensation model according to an embodiment of the present disclosure.
Figure 12:
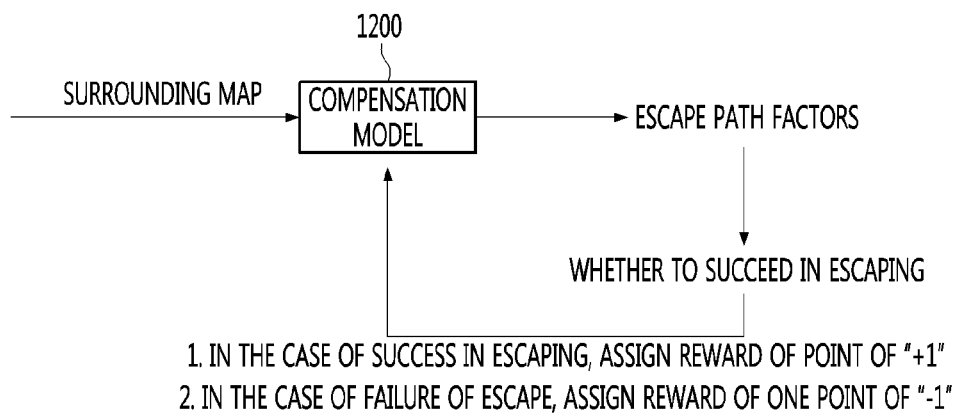
Figure 13:
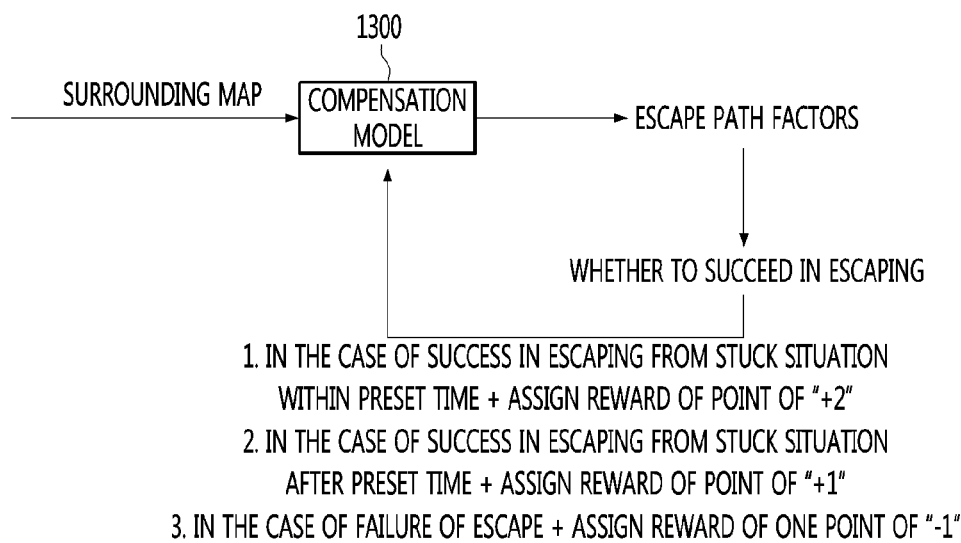

FIGS. 11 to 13 are views illustrating a reinforcement learning procedure for a compensation model according to an embodiment of the present disclosure.

FIG. 11 is a flowchart illustrating a reinforcement learning procedure for the compensation model according to an embodiment of the present disclosure.

Hereinafter, although it is assumed that the learning method for the compensation model is performed by the learning processor 130 of the robot cleaner 100, this is only for the illustrative purpose. The learning method may be performed by the learning processor 240 of the AI server 200.

If the compensation model is trained by the learning processor 240 of the AI server 200, the robot cleaner 100 may receive the compensation model from the AI server 200, and may store the received compensation model in the memory 170.

Referring to FIG. 11, the learning processor 130 of the robot cleaner 100 acquires a surrounding map based on 3D image data and a bumper event (S1101).

The learning processor 130 may generate surrounding map data by combining 3D image data and bumper event for learning, and may acquire the surrounding map using the surrounding map data.

The learning processor 130 determines escape path factors from the surrounding map by using the compensation model (S1103).

The compensation model may be an artificial neural network based model trained through reinforcement learning.

The compensation model may be trained through reinforcement learning by a well-known deep Q-network (DQN) algorithm.

The learning processor 130 acquires escape information including whether the robot cleaner 100 succeeds in escaping the stuck situation and an escape time taken until the robot cleaner 100 escapes from the stuck situation, based on the determined escape path factors (S1105).

If the robot cleaner 100 is in a stuck situation, the learning processor 130 may determine whether to succeed in escaping from the stuck situation.

The learning processor 130 may determine whether to succeed in escaping from the stuck situation, based on the bumper event detected by the bumper sensor.

For example, if the learning processor 130 detects that bumper events occur less than the preset number of times, the learning processor 130 may determine that the robot cleaner succeeds in escaping from the stuck situation.

After the learning processor 130 determines that the robot cleaner 100 is in a stuck situation, the learning processor 130 may measure an escape time, which is a time taken until the robot cleaner 100 escapes from the stuck situation.

The learning processor 130 may be provided with a timer to measure the escape time.

The learning processor 130 determines whether the robot cleaner 100 succeeds in escaping from the stuck situation, based on the escape information (S1107).

If the robot cleaner 100 fails to escape from the stuck situation, the learning processor 130 assigns a penalty to the compensation model (1109).

If the learning processor 130 succeeds in escaping the stuck situation, the robot cleaner 100 determines whether the robot cleaner 100 succeeds in escaping from the stuck situation within a preset time (S1111).

If the robot cleaner 100 succeeds in escaping the stuck situation after the preset time, the learning processor 130 assigns a reward of the first value to the compensation model (S1113) and assigns a reward of the second value to the compensation model, if the robot cleaner 100 succeeds in escaping from the stuck situation within the preset time (S1115).

Reinforcement Learning may be mainly performed by the Markov Decision Process (MDP).

Regarding the Markov Decision Process (MDP), first, an environment having information necessary for an agent to perform a next action is provided.

Second, the manner of an action performed based on an environment is defined under the environment.

Third, an action of the agent to be assigned with a reward and an action of the agent to be assigned with a penalty are defined.

Fourth, the optimal policy is derived through repeated experience until a future reward reaches the maximum point.

If the MDP is applied to the present disclosure, the agent may be the robot cleaner or a compensation model.

First, according the present disclosure, surrounding map information may be provided, in which the surrounding map information is an environment having information, which is necessary for compensation models 1200 and 1300 illustrated in FIGS. 12 and 13 to perform next actions.

Second, in the present disclosure, the manner of the actions by the compensation models 1200 and 1300 based on the provided environment may be determined. In other words, escape path factors of the robot cleaner 100 may be determined.

Third, if the robot cleaner 100 succeeds in escaping from the stuck situation according to the escape path factors of the robot cleaner 100 determined by the compensation models 1200 and 1300, a reward may be assigned to the compensation models 1200 and 1300. If the robot cleaner 100 fails to escape from the stuck situation, a penalty may be assigned to the compensation models 1200 and 1300.

In other words, as illustrated in FIG. 12, if the robot cleaner 100 succeeds in escaping the stuck situation, a reward of +1 point is assigned to the compensation model 1200. Otherwise, a penalty of −1 may be assigned to the compensation model 1200.

As another example, as illustrated in FIG. 13, reward and a penalty of policies may be further specified.

In other words, as illustrated in FIG. 13, if the robot cleaner 100 succeeds in escaping from the stuck situation within a preset time, a reward of +2 points may be assigned to the compensation model 1300.

In addition, if the robot cleaner 100 succeeds in escaping from the stuck situation after the preset time, a reward of +1 point may be assigned to the compensation model 1300. If the cleaning time is less than a threshold time and the cleanliness is less than a reference cleanliness, a penalty of "−1" may be assigned to the compensation model 1300.

Fourth, the compensation models 1200 and 1300 are repeatedly trained until a future reward reaches the maximum point to acquire the optimal policy, that is, escape path factors for escaping from the stuck situation and for minimizing the escape time.

The parameters of the compensation models 1200 and 1300, which are formed based on artificial neural networks, may be updated using feedback indicating the maximum point of the future reward.

In addition, as the artificial neural network is trained, the acquired learning result may be stored in the memory 170 by using actions of the compensation models 1200 and 1300 and using the feedback based on the actions.

The learning result may refer to parameters of the compensation models 1200 and 1300 that are updated through the feedback such as cleaning time and cleanliness. The learning result may constitute a portion of an artificial neural network forming the compensation models 1200 and 1300.

As another example, the compensation models 1200 and 1300 may be generated by training an artificial neural network in the AI server 200. If the training is completed, the compensation models 1200 and 1300 may be installed on the robot cleaner 100.

The compensation models 1200 and 1300 may be implemented in hardware, software, or a combination of hardware and software. If some or all of the compensation models 1200 and 1300 are implemented in software, one or more instructions constituting the compensation models 1200 and 1300 may be stored in the memory 170.

The environment or state used for learning for the compensation models 1200 and 1300 may be named training input parameters.

An input parameter for training may correspond to the cleaning environment information.

The compensation models 1200 and 1300 may output the values of the escape path factors as result values using the input training parameters.

The following description will be made with reference to FIG. 8 again.

The processor 180 controls the driving device 160 to travel according to the determined escape path factors (S809).

In other words, the processor 180 may control the driving driver 160 to travel according to the rotation angle, the rotation direction, the forward direction, or the backward direction, which is determined, of the robot cleaner 100.

As such, according to an embodiment of the present disclosure, if the stuck situation of the robot cleaner 100 is detected, the robot cleaner 100 may rapidly escape from the stuck situation.

Accordingly, the unnecessary power consumption of the robot cleaner 100 may be prevented and the ability to coping with the stuck situation may be improved.

Figure 14:
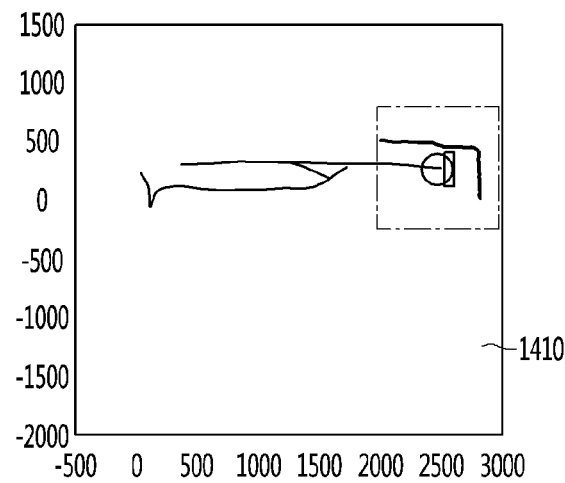
FIGS. 14 to 16 are views illustrating that a robot cleaner avoids a stuck area based on the situation of the surrounding map.
Figure 14:
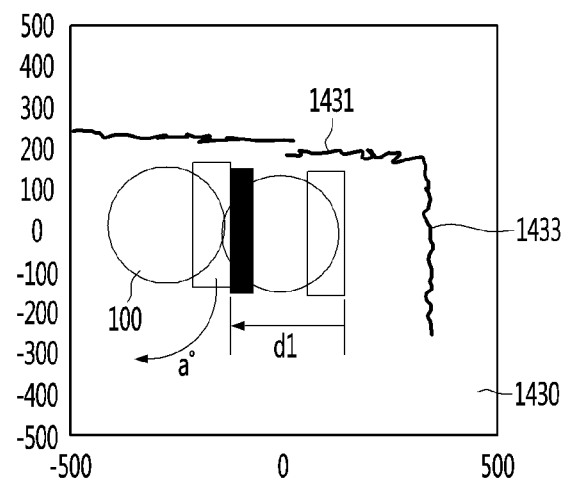
Figure 14:
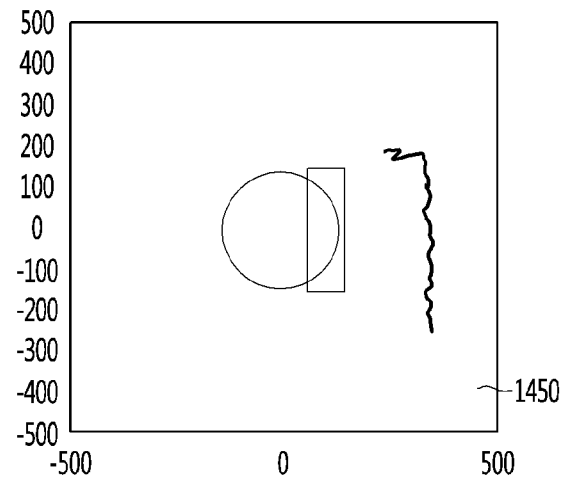
Figure 15:
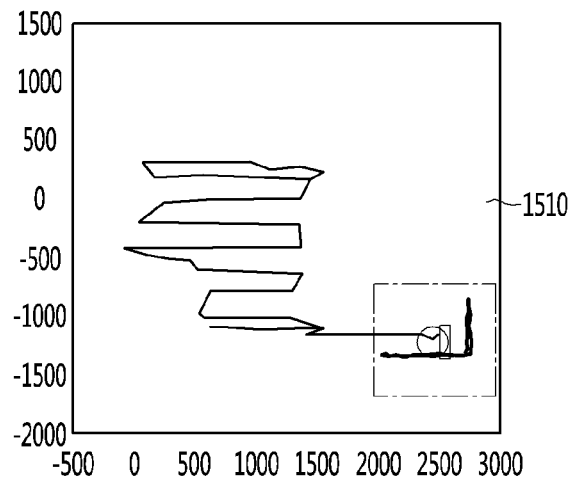
Figure 15:
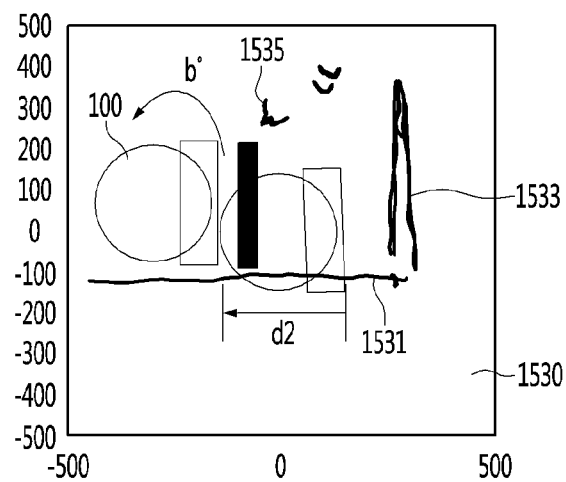
Figure 15:
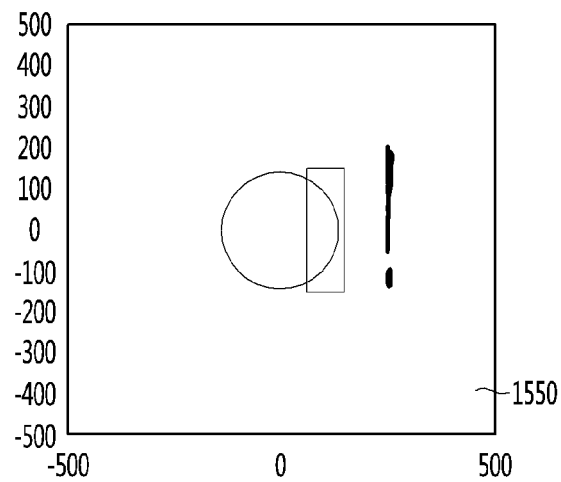
Figure 16:
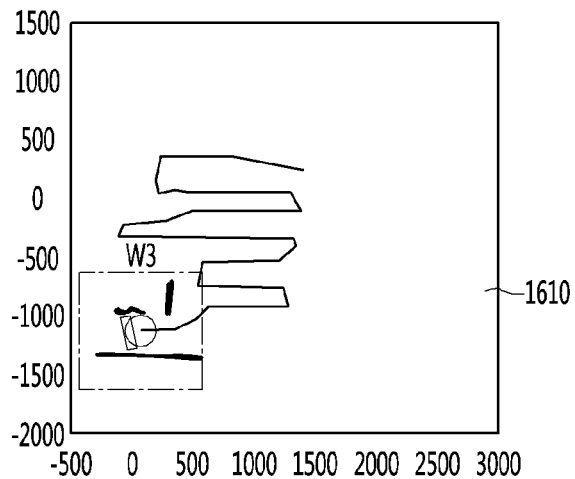
Figure 16:
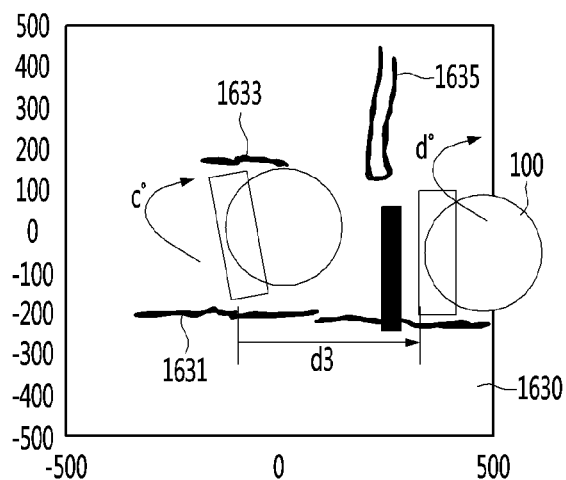
Figure 16:
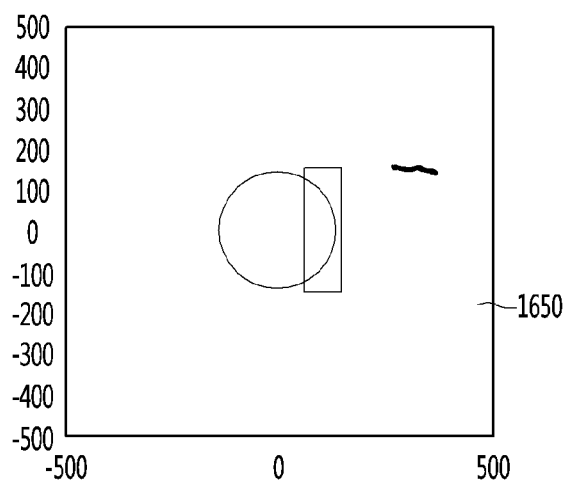

FIGS. 14 to 16 are views illustrating that a robot cleaner avoids a stuck area based on the situation of the surrounding map.

The following description will be made first with reference to FIG. 14.

Referring to FIG. 14, a full map 1410, a surrounding map 1430, and real-time sensing information 1450 are illustrated.

The robot cleaner 100 may determine the optimal escape path factors from the surrounding map 1430 based on the previously trained compensation model.

The surrounding map 1430 may include a left obstacle 1431 and a front obstacle 1433 generated based on 3D data and a bumper event.

The robot cleaner 100 may detect a stuck situation through the surrounding map 1430 and determine escape path factors based on an obstacle state of the surrounding map 1430.

In more detail, the robot cleaner 100 may control the driving device 160 to travel after moving backward by the first distance "d1" to avoid the front obstacle 1433, and then turning right at the first angle ("a" degree) to avoid the left obstacle 1431.

In other words, the escape path factors may be a backward distance corresponding to the first distance of "d1" and a right-turn angle (degree of "a").

The following description will be made with reference to FIG. 15.

Referring to FIG. 15, a full map 1510, a surrounding map 1530, and real-time sensing information 1550 are illustrated.

The robot cleaner 100 may determine the optimal escape path factors from the surrounding map 1530 based on the previously trained compensation model.

The surrounding map 1530 may include a right obstacle 1531, a front obstacle 1533, and a left obstacle 1535 generated based on 3D data and a bumper event.

The robot cleaner 100 may detect a stuck situation through the surrounding map 1430 and determine the escape path factors based on an obstacle state of the surrounding map 1530.

In more detail, the robot cleaner 100 may control the driving device 160 to travel after moving backward by the second distance of "d2" to avoid the front obstacle 1533 and the left obstacle 1535, and then turning left at the second angle (degree of "b") to avoid the right obstacle 1531.

In other words, the escape path factors may be a reward distance corresponding to the second distance "d2" and a left-turn angle of degree of "b".

The following description will be made with reference to FIG. 16.

Referring to FIG. 16, a full map 1610, a surrounding map 1630, and real-time sensing information 1650 are illustrated.

The robot cleaner 100 may determine the optimal escape path factors from the surrounding map 1630 based on the previously trained compensation model.

The surrounding map 1630 may include a left obstacle 1631, a first right obstacle 1633, and a second right obstacle 1635 generated based on 3D data and a bumper event.

The robot cleaner 100 may detect a stuck situation through the surrounding map 1630 and determine escape path factors based on an obstacle state of the surrounding map 1630.

In more detail, the robot cleaner 100 may control the driving device 160 to travel after turning right at the third angle (the degree of "c"), and then moving backward by the third distance of "d3" to avoid the left obstacle 1631, the first right obstacle 1633, and the second right obstacle 1635.

Thereafter, the robot cleaner 100 may control the driving device 160 to travel straight after turning right at a fourth angle (degree of "d") to avoid the second right obstacle 1635.

As described above, according to an embodiment of the present disclosure, the robot cleaner 100 may effectively avoid the confined area based on the optimal escape path factors from the surrounding map through the compensation module based on the reinforcement learning.

Accordingly, the robot cleaner 100 may rapidly cope with the stuck situation, the power consumption of the robot cleaner 100 is saved, and the physical impact applied to the robot cleaner 100 may be reduced.

The present disclosure may also be embodied as computer readable codes on a computer readable recording medium. The computer readable recording medium is any data storage device that may store data which may be thereafter read by a computer system. Examples of the computer readable recording medium include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof.

What is claimed is:

1. A robot cleaner configured to avoid a stuck situation through an artificial intelligence (AI), the robot cleaner comprising:
    at least one sensor configured to acquire sensing information;
    a driving motor configured to drive the robot cleaner;
    a memory configured to store a compensation model to infer escape path factors from a learning surrounding map; and
    at least one processor configured to:
    acquire a surrounding map, based on the sensing information,
    determine escape path factors based on the surrounding map by using the compensation model, when the stuck situation of the robot cleaner is detected, and
    control the driving motor so that the robot cleaner travels, based on the determined escape path factors,
    wherein the at least one processor is configured to:
    assign a reward or a penalty to the compensation model, based on at least one of whether the robot cleaner succeeds in escaping from the stuck situation or an escape time,
    assign a reward of a first value to the compensation model, when the robot cleaner succeeds in escaping from the stuck situation within a preset time, and
    assign a reward of a second value less than the first value to the compensation model when the robot cleaner succeeds in escaping from the stuck situation, after the preset time.

2. The robot cleaner of claim 1, wherein the escape path factors include at least one of a rotation angle, a rotation direction, a forward direction, or a backward direction.

3. The robot cleaner of claim 2, wherein the at least one sensor includes:
    a bumper sensor configured to sense a bumper event; and
    a depth sensor configured to acquire three-dimensional (3D) data, and
    wherein the surrounding map is generated by the bumper event and the 3D data.

4. The robot cleaner of claim 3, wherein the compensation model is a model based on an artificial neural network which is trained through reinforcement learning in a deep learning algorithm or a machine learning algorithm, and
    wherein the reinforcement learning is performed through a Markov decision process.

5. The robot cleaner of claim 4, wherein the at least one processor is configured to:
    acquire the escape path factors based on an output result of the compensation model from the learning surrounding model, and
    acquire, based on the acquired escape path factors, whether the robot cleaner succeeds in escaping from the stuck situation and the escape time taken until the robot cleaner escapes the stuck situation.

6. The robot cleaner of claim 3, wherein the bumper sensor measures an impulse applied to a bumper provided in the robot cleaner, and generates the bumper event when the impulse is equal to or greater than a preset impulse, and
    wherein the at least one processor is configured to determine the robot cleaner as being in the stuck situation, when number of times that the bumper event occurs is equal to or greater than a preset number of times.

7. The robot cleaner of claim 6, wherein a cliff sensor is provided at a lower surface of the bumper of the robot cleaner, and
    wherein the cliff sensor is configured to measure a distance between the floor and the cliff sensor using a transmitted infrared signal and a reflected infrared signal.

8. The robot cleaner of claim 7, wherein the at least one processor is configured to determine that the robot cleaner reaches a staircase or a cliff when the measured distance is equal to or greater than a certain distance or when the reflected infrared signal is not detected for a certain time.

9. The robot cleaner of claim 3, wherein the surrounding map includes at least one obstacle.

10. The robot cleaner of claim 2, wherein the driving motor includes:
a left wheel motor to drive a left wheel; and
a right wheel motor to drive a right wheel, and
wherein the at least one processor is configured to:
control the left wheel motor and the right wheel motor so that the robot cleaner rotates at the rotation angle and in the rotation direction, and
control the left wheel motor and the right wheel motor so that the robot cleaner travels a forward distance or a backward distance.

11. An operating method of a robot cleaner to avoid a stuck situation through an artificial intelligence (AI), the operating method comprising:
acquiring a surrounding map, based on sensing information acquired through at least one sensor;
determining escape path factors based on the surrounding map by using a compensation model for inferring the escape path factors from a learning surrounding map, when the stuck situation of the robot cleaner is detected; and
controlling a driving motor of the robot cleaner so that the robot cleaner travels, based on the determined escape path factors,
wherein the operating method further comprises:
assigning a reward or a penalty to the compensation model, based on at least one of whether the robot cleaner succeeds in escaping from the stuck situation or an escape time;
assigning a reward of a first value to the compensation model, when the robot cleaner succeeds in escaping from the stuck situation within a preset time; and
assigning a reward of a second value less than the first value to the compensation model when the robot cleaner succeeds in escaping from the stuck situation, after the preset time.

12. The operating method of claim 11, wherein the escape path factors include at least one of a rotation angle, a rotation direction, a forward direction, or a backward direction.

13. The operating method of claim 12, wherein the at least one sensor includes:
a bumper sensor configured to sense a bumper event; and
a depth sensor configured to acquire three-dimensional (3D) data, and
wherein the surrounding map is generated by the bumper event and the 3D data.

14. The operating method of claim 13, wherein the compensation model is a model based on an artificial neural network which is trained through reinforcement learning in a deep learning algorithm or a machine learning algorithm, and
wherein the reinforcement learning is performed through a Markov decision process.

15. The operating method of claim 14, further comprising:
acquiring the escape path factors based on an output result of the compensation model from the learning surrounding model; and
acquiring, based on the acquired escape path factors, whether the robot cleaner succeeds in escaping from the stuck situation and the escape time taken until the robot cleaner escapes the stuck situation.

16. The operating method of claim 13, wherein the surrounding map includes at least one obstacle.

17. The operating method of claim 12, wherein the bumper sensor measures an impulse applied to a bumper provided in the robot cleaner, and generates the bumper event when the impulse is equal to or greater than a preset impulse, and
wherein the operating method further comprises determining the robot cleaner as being in the stuck situation, if the when number of times that the bumper event occurs is equal to or greater than preset number of times.

18. The operating method of claim 12, wherein the driving motor includes:
a left wheel motor to drive a left wheel; and
a right wheel motor to drive a right wheel,
wherein the controlling of the driving motor includes:
controlling the left wheel motor and the right wheel motor so that the robot cleaner rotates at the rotation angle and in the rotation direction; and
controlling the left wheel motor and the right wheel motor so that the robot cleaner travels a forward distance or a backward distance.

19. A robot cleaner configured to avoid a stuck situation through an artificial intelligence (AI), the robot cleaner comprising:
at least one sensor configured to acquire sensing information;
a driving motor configured to drive the robot cleaner;
a memory configured to store a compensation model to infer escape path factors from a learning surrounding map; and
at least one processor configured to:
acquire a surrounding map, based on the sensing information,
determine the escape path factors based on the surrounding map by using the compensation model, when the stuck situation of the robot cleaner is detected, and
control the driving motor so that the robot cleaner travels, based on the determined escape path factors,
wherein the escape path factors include at least one of a rotation angle, a rotation direction, a forward direction, or a backward direction,
wherein the at least one sensor includes:
a bumper sensor configured to sense a bumper event, and
a depth sensor configured to acquire three-dimensional (3D) data,
wherein the surrounding map is generated by the bumper event and the 3D data,
wherein the bumper sensor measures an impulse applied to a bumper provided in the robot cleaner, and generates the bumper event when the impulse is equal to or greater than a preset impulse, and
wherein the at least one processor is configured to determine the robot cleaner as being in the stuck situation, when number of times that the bumper event occurs is equal to or greater than preset number of times.

* * * * *